United States Patent [19]
Leighton

[11] Patent Number: 6,136,592
[45] Date of Patent: Oct. 24, 2000

[54] MULTIPLE MICRO-ARRAYS

[76] Inventor: Stephen B. Leighton, 9007 Woodland Dr., Silver Spring, Md. 20910

[21] Appl. No.: 09/413,956

[22] Filed: Oct. 7, 1999

Related U.S. Application Data

[63] Continuation-in-part of application No. 09/344,544, Jun. 25, 1999.

[51] Int. Cl.[7] ............................. C12M 3/00; C12Q 1/68; G01N 21/00
[52] U.S. Cl. ................................... 435/288.7; 435/287.2; 435/6; 422/50; 422/58
[58] Field of Search ............................. 435/288.3, 287.2, 435/6; 422/50, 58

[56] References Cited

U.S. PATENT DOCUMENTS

| | | | |
|---|---|---|---|
| 5,486,335 | 1/1996 | Wilding et al. | 422/55 |
| 5,744,366 | 4/1998 | Kricka et al. | 436/63 |
| 5,800,992 | 9/1998 | Fodor et al. | 435/6 |

*Primary Examiner*—W. Gary Jones
*Assistant Examiner*—B J Forman
*Attorney, Agent, or Firm*—Pendorf & Cutliff

[57] ABSTRACT

A method and device are provided for simultaneously creating a plurality of identical micro-arrays of biological samples. The invention utilizes a plurality of substrates, each of which having a top side, a bottom side, and a pattern of through-holes. Each through-hole has a wider upper cross-section, a narrower lower cross-section, and a step or plateau formed in the transition area. When the substrates are stacked, through-holes are in registry and form tunnels extending through the stack of substrates. Reagents of interest are caused to flow through the tunnels and deposit on the step or plateau area. A barrier layer may be provided to prevent leak-through between neighboring holes. After the desired reagents have been deposited, the substrates are separated. In this manner a series of micro-arrays, each capable of containing hundreds or thousands of biological samples such as cDNA fragments, is formed simultaneously.

9 Claims, 3 Drawing Sheets

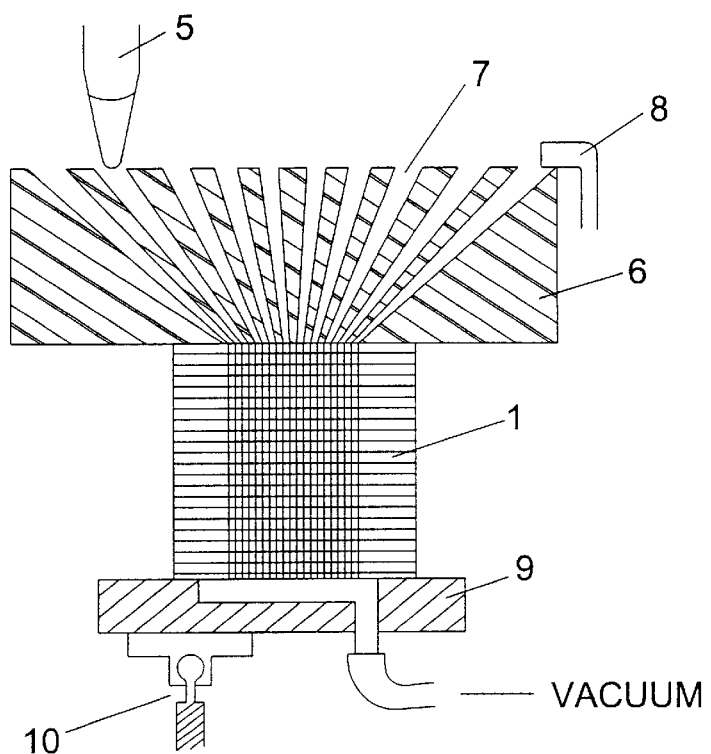
Fig. 3
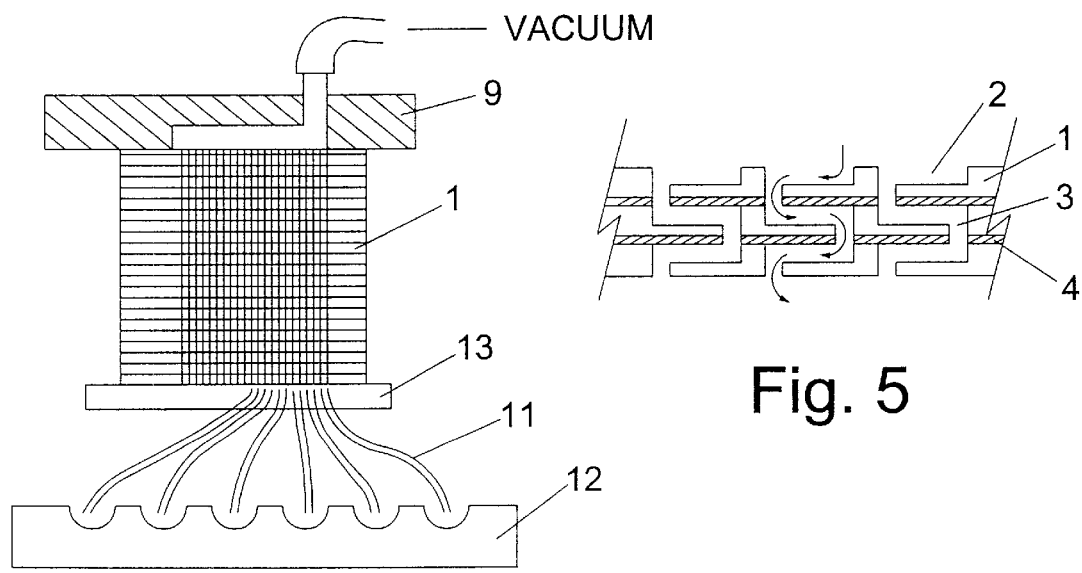
Fig. 5
Fig. 4

MULTIPLE MICRO-ARRAYS

REFERENCE TO RELATED APPLICATION

This Application is a continuation-in-part of U.S. application Ser. No. 09/344,544 entitled "METHOD AND DEVICE FOR CREATING MICRO-ARRAYS" filed Jun. 25, 1999.

BACKGROUND OF THE INVENTION

1. Field of the Invention

The invention relates to a method and device capable of simultaneously creating a series of identical micro-arrays, each micro-array comprising hundreds or thousands of analyte-assay regions on a solid support, each analyte-specific reagent useful, for example, in detecting labeled cDNA in hybridization assays.

2. Description of the Related Art

Micro-arrays of hundreds or thousands of biological analyte-assay regions are widely used for biological analysis. Tiny droplets, each containing a different known reagent, usually distinct polynucleotide or polypeptide biopolymers such as known DNA fragments, are deposited and immobilized in a regular array on a solid substrate such as a glass microscope slide. The array of dried droplets is exposed to a solution containing an unknown, for example complementary DNA (cDNA) fragments pre-labeled with fluorescent or radioactive chemical tags. Binding reactions or hybridizations occur wherever there is a match between the complementary sequence polynucleotides in the array and the cDNA. Subsequent optical or radiosensitive scanning determines which spots contain tags, thereby identifying the complementary compounds present in the solution.

While micro-arrays provide a useful tool for rapid biological analysis, the processes by which the micro-arrays are produced remain time consuming and expensive.

For example, it is known from U.S. Pat. No. 5,807,522 (Shalon et al.) to use capillary pens of various geometries to print or spot droplets onto substrates, one substrate at a time. Although multiple (typically 8 or 16) pens may be used simultaneously, often under robotic control, each pen or group of pens is loaded with only one reagent per pen. The pen(s) are then touched to one substrate after another, depositing nearly identical droplets on each. After each of the set of substrates to be prepared (typically a few dozen to several hundred) has been spotted with a first set of reagent droplets, the set of pens is washed and dried, reloaded with the next set of reagents and the next set of droplets are printed onto the same substrates at adjacent locations. This procedure is time consuming and requires expensive and elaborate equipment to achieve precision and speed.

Another known method involves long flexible capillary tubes to carry fluid from sets of storage wells to the tips of the tubes, which tips are applied to one substrate after another in a manner similar to Shalon et al. This method suffers all of the same disadvantages as Shalon et al. and also requires a significant volume of expensive reagent to be stored in the capillary tubes.

Still another known method is disclosed in U.S. Pat. No. 5,800,992 (Fodor et al.) and involves combinatorial chemistry to synthesize oligonucleotides on the substrate with a series of chemical reactions (Affymetrix). This method is limited to oligonucleotides and is not suitable for long stranded cDNA's. In addition, the sequence of the oligonucleotides must be known in advance. This method also suffers the disadvantages of requiring cumbersome expensive equipment and involving time consuming reaction steps.

In order to amplify the fluorescence or radioactivity signal indicative of a binding reaction, U.S. Pat. No. 5,843,767 (Beattie) teaches the provision of a multiplicity of discrete channels running through the substrate and arranged in groups, and with binding reagent immobilized on the walls of the channels. The channels increase the amount of surface area in the substrate available for the binding, thus theoretically improving detection sensitivity and efficiency. However, in practice, it has been found that the improvements were not as great as expected, since the detection optics will still be limited to direct reception only from the projected area.

SUMMARY OF THE INVENTION

In view of the foregoing disadvantages inherent in known methods of manufacture and types of micro-arrays, it is an object of the present invention to provide an improved method and device for simultaneously creating a plurality of identical micro-arrays of biological samples.

The invention utilizes a plurality of substrates, each of which having a top side, a bottom side, and a pattern of through-holes. Each through-hole has a wider upper cross-section, a narrower lower cross-section, and preferably a step or plateau parallel to the top side of the substrate formed in the transition area. When a number of substrates are stacked, the corresponding through-holes are in registry and form tunnels extending through the stack of substrates. Reagents of interest are caused to flow through the tunnels and deposit on the step or plateau area. Thereby all substrates in the stack are "spotted" simultaneously, at precise locations and with a precise amount of reagent. A barrier layer may be provided between substrates to prevent leak-through between neighboring holes.

After the desired reagents have been deposited, the substrates are separated. In this manner a series of micro-arrays, each capable of containing hundreds or thousands of biological samples such as cDNA fragments, is formed simultaneously.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other methods and devices for producing micro-arrays and for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description in conjunction with the accompanying drawings in which:

FIG. 3 is a cross-sectional view of a stack of substrates combined with a means for filling them using a pipette. This figure also shows a clamping means.

FIG. 4 is a cross-sectional view of a stack of substrates combined with a means for filling them using vacuum suction and tubes to a micro-titre tray.

FIG. 5 is a cross section through a stack of substrates as in FIG. 2 but in an alternative arrangement.

FIG. 6b is a cross-sectional view through two gasket and two substrate layers according to FIG. 6a.

DETAILED DESCRIPTION OF THE INVENTION

Figure 1:
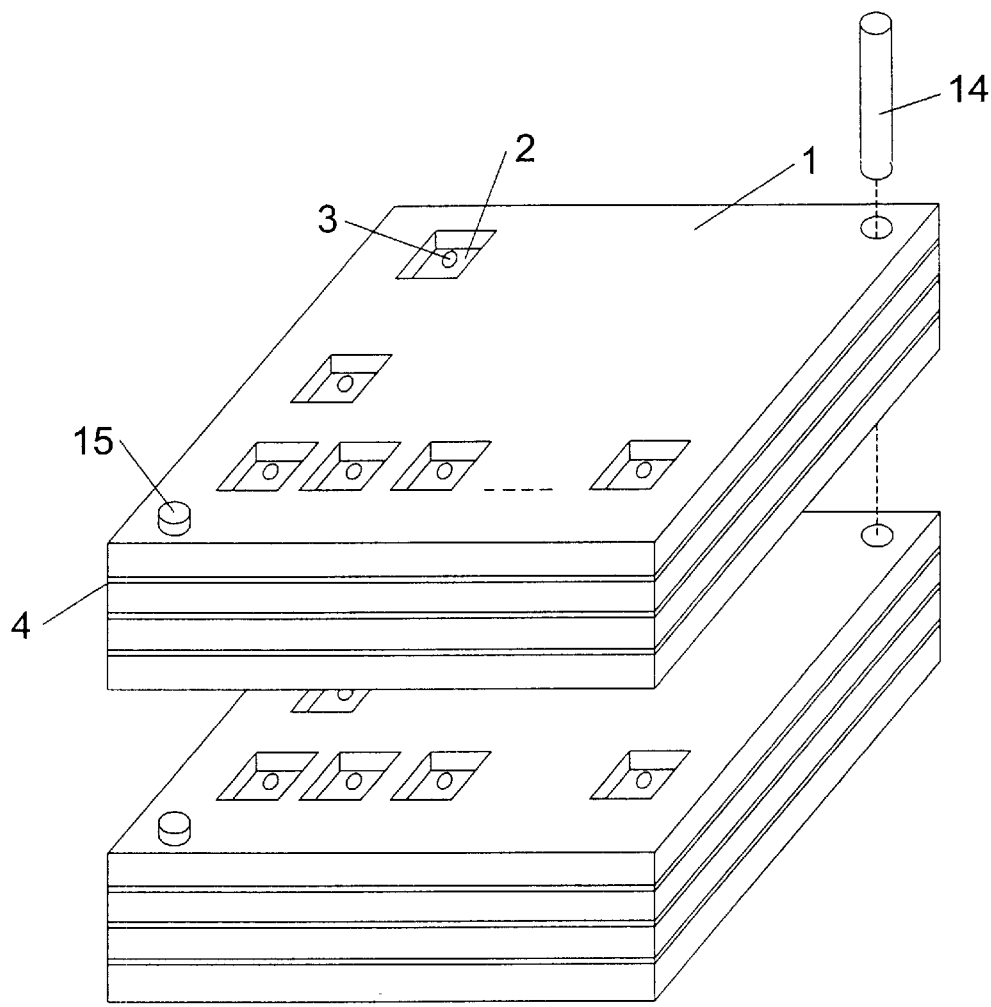
FIG. 1 is an isometric drawing of stack of substrates, showing the matching holes and pockets.

The present invention is concerned with a method of forming a micro-array of analyte-assay regions on a solid support, where each region in the array has a known amount of a selected, analyte-specific reagent. More generally, there is provided a substrate for use in detecting binding of labeled polynucleotides to one or more of a plurality different-sequence, immobilized polynucleotides.

Micro-arrays, and reagents used in the formation thereof, are well known in the art and thus need not be described herein in any great detail. The reagents are preferably distinct polynucleotide or polypeptide biopolymers fixed to the substrate.

Methods of using the micro-arrays, such as by contacting fluorescent reporter-labeled cDNAs with a micro-array of polynucleotides representing a plurality of known DNA fragments under conditions that result in hybridization of the labeled cDNAS to complementary-sequence polynucleotides in the array followed by examination by fluorescence under fluorescence excitation conditions, are also well known in the art and thus need not be described herein in greater detail. For a discussion of techniques reference may be made to U.S. Pat. No. 5,800,992 (Fodor et al.) and U.S. Pat. No. 5,807,522 (Brown et al.), the disclosures of which are incorporated herein by reference.

The present invention is specifically concerned with the method and device with which a plurality of identical micro-arrays of biological samples can be easily and quickly produced.

A significant and distinguishing feature of the present invention resides in the utilization of a plurality of substrates, each of which having a top side, a bottom side, and a pattern of through-holes. Each through-hole has a wider upper cross-section, a narrower lower cross-section, and preferably a step or plateau parallel to the top side of the substrate formed in the transition area. When a number of substrates are stacked, the corresponding through-holes are in registry and form tunnels extending through the stack of substrates. Reagents of interest are caused to flow through the tunnels and deposit on the step or plateau area. Thereby all substrates in the stack are "spotted" simultaneously, at the precise location and with a precise amount of reagent. A barrier layer may be provided between substrates to prevent leak-through between neighboring holes.

After the desired reagents have been deposited, the substrates are separated. In this manner a series of micro-arrays, each capable of containing hundreds or thousands of biological samples such as cDNA fragments, is formed simultaneously.

Thus, in comparison to the prior art planar array of substrates which are addressed one at a time by devices designed to deposit reagent onto only the surface of one substrate after another, the present invention comprises a stack of preferably identical substrates each having the same pattern of through-holes, with one hole in each substrate corresponding to each spot of analyte-specific reagent intended in the final array. For example, if it were desired to create 100 identical arrays with one array per substrate and with each array having 10,000 different spots, then 100 identical substrates will be used, each manufactured with 10,000 through-holes, the through-holes are in registry when the substrates are stacked.

The term "registry" as used herein simply means that through-holes of adjacent substrates in the stack are in communication. In a preferred embodiment of the invention, the stack is formed such that horizontal step or plateau areas of each column of through-holes appear to be superimposed. These horizontal step or plateau area can be referred to for brevity as a discrete assay region or a "spot zone". In order for micro-array bearing substrates to be used interchangeably, it is preferred that the spot zones on each substrate are identical, such that assay spotting can be carried out by robotic means programmed to spot at specific x,y coordinates. The areas of narrower cross-section are preferably provided on one side of the spot zone, i.e., at one of the edges of the spot zone. More preferably, the area of narrower cross section of the through-hole of even numbered slides in a stack are provided on one side of the spot zone (e.g., right side), and the area of narrower cross section of the through-hole of odd numbered slides in the same stack are provided on the opposite side of the spot zone (e.g., left side), such that reagent flowing through the tunnel is caused to "slalom" back and forth, washing over each of the spot zones with reagent, and ensuring that no bubbles are trapped in the tunnel.

In a preferred embodiment of the invention, the "spot zones" are patterned on a substrate in a pattern which has 180° symmetry, i.e., when a first substrate is rotated about 180° and stacked on top of a second, non-rotated substrate, through-holes remain in registry and tunnels are formed. This makes it possible to form all substrates using a single manufacturing technique, and to provide the areas of narrow diameter on one side of odd numbered slides, and to provide the areas of narrow diameter on the opposite side of even numbered slides, by simply rotating alternate numbered slides about 180° while stacking.

There is no theoretical limit on the size of the substrates, but they may typically be 0.5 to 5 cm in lateral dimensions, and 0.05 to 3 mm thick, and may be the size of a conventional microscope slide. Different sizes would be appropriate for different applications. The number, size and spacing of spots, and the number of substrates will depend on the number and the amounts of reagent to be used in the array.

When the identical substrates are arranged in a stack such that superimposed through-holes are in registry and form tunnels extending through the stack of substrates, they are preferably provided with a barrier seal between the slides such that no lateral leakage can occur from one tunnel to any other tunnel. Further, each hole in each substrate may be associated with a counterbore, countersink, or other (possibly eccentric) pocket in the substrate. These pockets create tiny volumes to the side of the line of holes through the substrates, when seen in cross-section. In addition, these pockets provide small areas of substrate surface area roughly parallel to the overall surface of each substrate. Preferably, each through-hole has a wider upper cross-section, a narrower lower cross-section, and preferably a step or plateau formed in the transition area parallel to the top side of the substrate.

The sealing means may be a hydrophobic viscous substance such as grease, wax, a weak adhesive, or any other bonding or sealing agent compatible with (inert to) the particular chemistry being used for the arrays. For other applications, a very thin elastomer layer (gasket) will suffice. It has also been found that the extremely smooth surfaces characteristic of the micro-machining processes proposed for manufacture of the substrates makes the sealing relatively simple. Indeed, for some applications it may be possible to rely entirely on the super-smooth surfaces of the substrates, such as glass slides, wherein adjacent slides are in continuous contact with each other with the exception of the through-holes.

The respective reagents used to create the array are injected at one end of each tunnel, generally the upper end of the tunnel, with each tunnel receiving (in general) a different reagent. The injections may be done one at a time or in groups or, preferably, simultaneously to all tunnels. The injection may be done with syringes, tubes, or other means; manually or automatically; with the aid of pumps of various sorts, with capillary action or with vacuum.

As the reagents flow through the tunnels extending through the stack substrates, including the side pockets formed by the areas of the through-holes with greater diameter, they will react with, and bond to, the exposed surfaces of said tunnels with side pockets, dependent on the chemistry of the particular reagents and surface in use, in a manner analogous to that which occurs in the prior art when droplets are physically deposited on flat surfaces. Drying can occur after deposition, also in a manner analogous to that which occurs in the conventional techniques. Thus, all of the same chemistries and combinations now in use in the state of the art may be used to advantage for particular applications with the method and device of the present invention.

After whatever reactions are desired in the entire stack have been completed and the stack has dried, the stack may be separated into its individual substrates by simply releasing the sealing means, if any. At this point multiple identical individual substrates are available for hybridization, etc. as with the conventional techniques. However, instead of having spotted each of dozens or hundreds of slides, the spotting process was only carried out once.

The identical patterns of holes (and associated side-pockets or areas of greater diameter) are preferably manufactured using silicon or glass micro-lithography and micro-machining techniques. This technology is ideally suited for inexpensive production of multiple identical patterns in the small sizes desired. However, other techniques, including but not limited to laser machining, plasma etching, and conventional machining or abrading may be used, as well as a technique involving the arrangement of dissimilar glass materials, one of which is acid etchable (channel glass) and in the form of fibers corresponding to the through-holes to be formed, the other of which is inert, followed by chemical etching to remove the etchable glass.

Protrusions (bosses) on one side of each substrate, for example on the top side of the substrate, and corresponding depressions on the opposite side, for example the bottom side, may be used to align the substrates to create a stack with all holes in registry. Alternately, pins can be placed through alignment holes provided in all of the substrates to achieve the same end. Further yet, if the machining is sufficiently accurate, the substrates can be aligned with reference to their edges by providing guides against which to rest all of the layers. Other methods for aligning will be obvious to anyone skilled in the art.

It is important to note that the position of the spots is determined during this initial manufacturing step and not by robotic sample deposition. Thus, tremendous precision can be achieved at relatively low cost at a central high volume substrate manufacturing location. No expensive devices are required for the subsequent injection steps which might be carried out at a large number of different laboratories with different reagents. The central manufacturing step for manufacturing the substrates does not involve or determine the various reagents or site-selection or arrangement of spots, which can be chosen by the individual user laboratories.

A variety of schemes can be used to connect a reagent injection means to the stack of substrates. Simple arrays of passive micro-funnels or channels can mediate the transition from a relatively coarse injection means to a relatively fine array spacing. Alternatively or additionally, simple but precise x-y positioning devices can be used to move the stack of arrays with respect to the injection means. Since hundreds or more substrates are being injected simultaneously, reasonable production rates are possible without the expense of fast robots as used in the prior art.

In the following the invention will be described in greater detail by reference to an illustrative embodiment shown in the figures. In FIG. 1 substrates 1 are stacked with intermediate adhesive layers 4. The adhesive layers have through-holes corresponding to the holes in the substrates to permit reagent to flow through the tunnel, and serve as horizontal barriers to prevent leakage of reagent between tunnels. Each substrate layer has an array of through-holes 3 in registry with the through holes of adjacent substrates. The adhesive is coated onto one or both of the top and bottom planar surfaces of the substrate in a manner such that the adhesive is interrupted at the location of the holes. Alternatively, the adhesive may be provided on the substrate prior to the step of forming the holes, in which case adhesive is removed at the same time and in the same areas in which the holes are formed.

As shown in FIG. 1, each through-hole has a wider upper cross-section, a narrower lower cross-section, and preferably a step or plateau 2 parallel to the top side of the substrate formed in the transition area. This step or plateau 2 ultimately forms the presentation area of the analyte-assay regions. Locating pins 14 and/or bosses 15 may be used for initial alignment or to maintain alignment of the stack.

Figure 2:
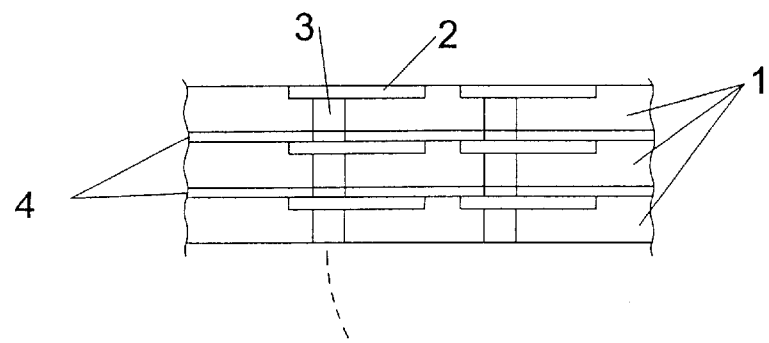
FIG. 2 is a cross-sectional view through part of one row of holes in a stack of substrates.

As can be seen in FIG. 2, the areas of the holes having the narrower cross-section 3 are in registry and connect to form a tunnel which extends completely through the stack from top to bottom, including extending through the adhesive layers 4. Side pockets are formed in the area of the step or plateau 2. Adhesive may or may not be on the substrate in the area of the plateau.

FIG. 3 shows a device which can be used for injecting in conjunction with a stack of the substrates 1 of the present invention. The stack of substrates is clamped between an adapter plate 6 and a vacuum manifold 9. Clamping pressure is provided by clamp 10 and frame 8. The adapter plate forms an injection mask with tapered holes 7 having a larger upper diameter for easy access for the injecting means such as a pipette tip and narrow lower diameter in registry with the through-holes. In the process of introducing reagent, an aliquot of reagent is introduced into the adapter plate and permitted to flow downwards by gravity or capillary action, or the flow is assisted by a pressure differential such as created by application of a slight vacuum to the lower end of each tunnel. Due to the cost of reagent, care is taken to ensure that sufficient reagent is drawn into the tunnel to completely fill the tunnel, but that no or only little excess is expelled from the bottom of the tunnel. This can usually be accomplished by adjusting the vacuum to be great enough to assist in drawing reagent into the tunnel, but not sufficiently large to overcome capillary forces which tend to keep the reagent inside the tunnel.

FIG. 4 represents an alternative embodiment of the invention, and shows a stack of substrates 1 clamped between an upper vacuum manifold 9 and a lower tubing adapter plate 13. Tubes 11 spread out to adapt to the spacing of wells in a micro-titre tray 12, and are in communication with the reagent provided in the wells of the micro-titre tray 12.

FIG. 5 is a cross section through a stack of substrates as in FIG. 2 but in an alternative arrangement wherein the pattern of through-holes 3 is staggered or alternating, defining a slalom path for the reagent. As long as there is a continuous path through each column of through-holes and pockets, the exact position of each need not be repeated exactly in adjacent or alternating layers. This alternating path may have the advantage in some situations of mixing the filling flow for better coverage of the bottoms of the pockets. It may be simplest to alternate between two different patterns, but it is also possible to have repeating patterns every three slides or random patterns. It is also simple to have the pockets all in line for the greatest simplicity in later observation and automated data acquisition, but it is not absolutely necessary for the proper operation of the method. Many possible variations will be obvious to one skilled in the art.

Figure 6A:
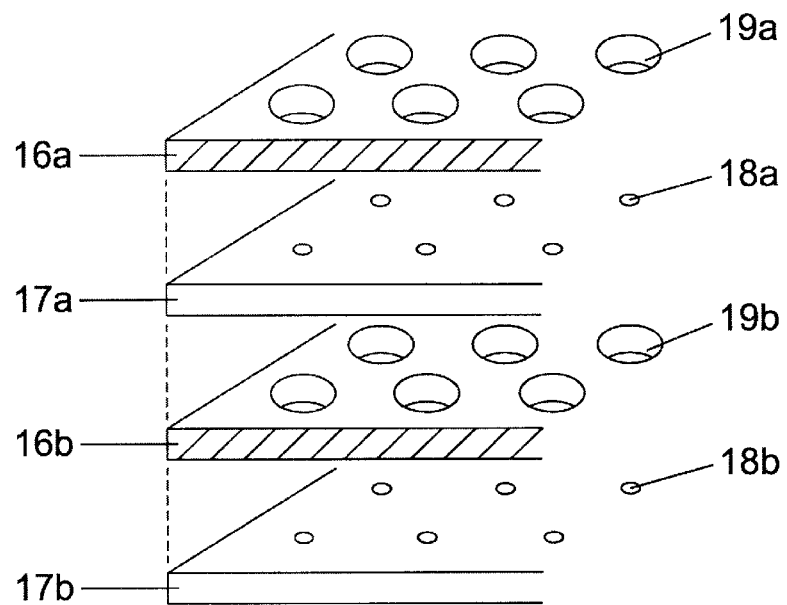
FIG. 6a is an exploded view of a stacking arrangement of alternating layers of wide aperture gasket and narrow aperture substrate, the layers not-to-scale, as used in an alternative embodiment of the invention.

The invention may also be carried out using the embodiment shown in FIGS. 6a (exploded) and 6b (assembled), with only two of potentially dozens of stacked alternating substrates and spacers being shown. In this embodiment, the substrates 17a, 17b have only narrow through-holes 18a, 18b machined through them, representing a simplification in the manufacturing process as compared to the stepped or countersunk substrates shown in FIGS. 1, 2 and 5. The individual planar deposition areas on the substrates are actually defined by holes 19a, 19b in the spacers 16a, 16b.

The spacers may be separable from the substrates, or alternatively a spacer layer may coated onto a substrate followed by etching of through-holes, or a spacer layer may be silk screen printed, offset printed, or otherwise printed onto the substrate, or a solid elastomeric or other film with pre-formed through-holes may be laminated onto a substrate layer. In order to minimize wastage of reagent, it is preferred that the spacer is comprised of a material which does not absorb reagent, and more preferably resists deposition of reagent, such as plastic (preferably an elastomeric polymer), rubber, wax, glass, and metal. Any of the materials discussed above with respect to the first embodiment of the invention can be used in the second embodiment of the invention.

The spacers are interposed between the substrate layers, with the holes in the separable spacers being larger than the through holes 18a, 18b in the substrate 17a, 17b. The spacer layer is of finite thickness, usually thinner than the substrate, thus creating a pocket between adjacent substrates, the pocket allowing reagent to contact and be deposited on the substrate as it flows through. The staggered substrate through-hole option as discussed above with respect to FIG. 5 may optionally used in the embodiment of FIGS. 6a and 6b.

Figure 6B:
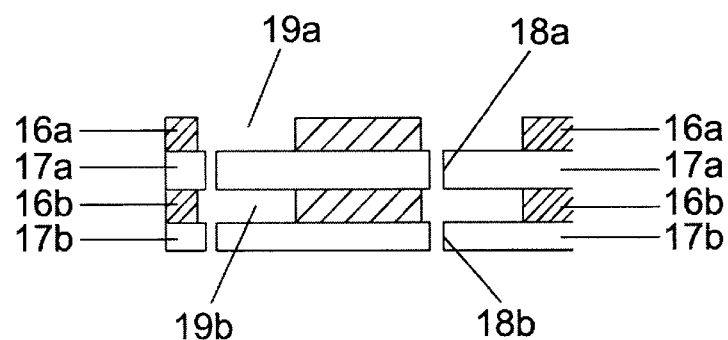

FIG. 6b is a cross-sectional view through two spacer and two substrate layers, showing the two sets of layers according to FIG. 6a in the assembled condition. It is apparent that reagent can flow continuously through spacer apertures 19a, 19b in the spacer 16a, 16b and the through holes 18a, 18b in the substrate 17a, 17b.

Figure 6C:
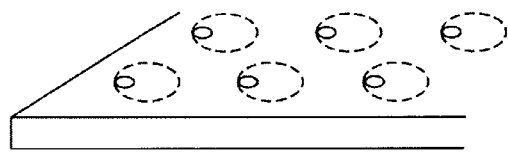
FIG. 6c is a view of a section of a micro-array prepared using the assembly of FIGS. 6a and 6b, showing six of the hundreds or thousands of analyte-assay regions formed on a solid support.

FIG. 6c is a view of a section of a micro-array prepared using the assembly of FIGS. 6a and 6b, showing six of the hundreds or thousands of analyte-assay regions remaining on the solid support after removal of the spacer 16a, 16b. Obviously, in the case that the spacer is coated or laminated onto the substrate, one spacer layer would remain adhered to each substrate, either on the top or on the bottom of the substrate. Actually, since the reagent will coat both sides of the substrate, either side of the substrate can be considered the top or useable side.

It is preferred that the spacer be kept as thin as possible in order to minimize the amount of reagent required and to minimize reagent deposition on the spacer. The selection and thickness of the spacer and substrate materials is a matter of preference and can be readily determined by those working in this art.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,

What is claimed is:

1. A substrate for use in making micro-arrays, said substrate having a top side, a bottom side, and multiple through-holes extending between said substrate top side and bottom side, each through-hole having an area of wider cross-section, an area of narrower cross-section, and a plateau formed in the transition area and wherein said substrate has at least 100 through-holes per $cm^2$.

2. A substrate as in claim 1, said substrate including a water impermeable sealing means provided on at least one surface thereof and bordering said through-holes.

3. A substrate as in claim 2, wherein said sealing means is selected from the group consisting of a hydrophobic viscous substance, a weak adhesive, and a polymeric elastomer.

4. A substrate as in claim 1, wherein at least a first plateau is provided with a first analyte-specific reagent, and wherein at least a second plateau is provided with a second analyte-specific reagent different from said first analyte-specific reagent.

5. A substrate as in claim 4, wherein said analyte-specific reagents are capable of detecting labeled cDNA in hybridization assays.

6. A substrate as in claim 1, wherein said substrate is glass or silicon.

7. A stack of substrates as in claim 1 for use in making micro-arrays, said stack comprising at least two substrates, each substrate having a top side, a bottom side, and multiple through-holes extending between said substrate top side and bottom side, each through-hole having an area of wider cross-section, an area of narrower cross-section, and a plateau formed in the transition area,
    wherein in said stack of substrates through-holes in corresponding positions are in registry such that they form continuous tunnels extending through said stack of substrates.

8. A stack of substrates as in claim 7, further including a barrier layer between said substrates which permits flow of fluids through said tunnel but prevents flow of fluid between adjacent tunnels.

9. A stack as in claim 7, wherein said stack includes at least 10 substrates.

* * * * *